(12) United States Patent
Yeri et al.

(10) Patent No.: US 12,513,141 B2
(45) Date of Patent: Dec. 30, 2025

(54) SYSTEMS AND METHODS FOR GENERATING A BLENDED USER BIOSIGNATURE USING MULTIMODAL AI

(71) Applicant: Wells Fargo Bank, N.A., San Francisco, CA (US)

(72) Inventors: Naveen Gururaja Yeri, Bangalore (IN); Rameshchandra Bhaskar Ketharaju, Hyderabad (IN); Shuvam Sengupta, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 113 days.

(21) Appl. No.: 18/615,707

(22) Filed: Mar. 25, 2024

(65) Prior Publication Data

US 2025/0300980 A1    Sep. 25, 2025

(51) Int. Cl.
*H04L 9/40*    (2022.01)
*G06F 16/28*    (2019.01)
(52) U.S. Cl.
CPC ........ *H04L 63/0861* (2013.01); *G06F 16/285* (2019.01)
(58) Field of Classification Search
None
See application file for complete search history.

(56) References Cited

U.S. PATENT DOCUMENTS

| | | | |
|---|---|---|---|
| 3,191,661 A | 6/1965 | Ray | |
| 8,775,809 B2 | 7/2014 | Tuyls | |
| 10,936,706 B2 | 3/2021 | Nowak | |
| 11,620,370 B2 | 4/2023 | Douglas | |
| 12,273,338 B2 * | 4/2025 | Slensker | H04L 63/0861 |
| 2010/0158327 A1 | 6/2010 | Kangas | |
| 2017/0213021 A1 * | 7/2017 | Potash | H04L 63/0861 |

* cited by examiner

*Primary Examiner* — Cai Y Chen
(74) *Attorney, Agent, or Firm* — K&L Gates LLP

(57) ABSTRACT

Systems, apparatuses, methods, and computer program products are disclosed for generation of a user biosignature. An example method includes extracting user data from a data environment, wherein the user data is associated with a user. The example method further includes analyzing the user data, wherein the user data comprises one or more data types, wherein the one or more data types comprise at least metadata and biometric data. The example method further includes determining a character classification associated with each of the one or more data types based on the analyzed user data, wherein the character classification comprises a primary character classification and a secondary character classification. The example method further includes generating a user biosignature based on the determined character classification, and outputting the generated user biosignature.

20 Claims, 8 Drawing Sheets

SYSTEMS AND METHODS FOR GENERATING A BLENDED USER BIOSIGNATURE USING MULTIMODAL AI

BACKGROUND

Identity verification systems are used in sectors where secure and accurate identification of users is crucial to prevent fraud, unauthorized access, or identity theft.

BRIEF SUMMARY

Identity verification systems typically employ methods such as two-factor authentication, biometrics, device or knowledge-based authentication, and document verification to confirm user identities. In this era, the implementation of identity verification systems has become increasingly important as technological advancements in artificial intelligence (AI) pose a threat to traditional methods of authentication. Many identity verification systems integrate methods of authentication that are difficult to forge, such as biometric authentication. However, the evolving landscape of AI necessitates continuous exploration of the full extent and applications of identity verification systems within the realm of biometric authentication.

Biometric authentication methods rely on the use of measurable physiological or behavioral characteristics that are unique to a user. Although biometric data is relatively difficult to forge as compared to traditional methods of authentication, technological advances in AI have made it possible to generate fake or spoof biometric signatures that mimic genuine ones (e.g., via high-resolution photographs, 3D-printed models, silicone molds, etc.). In particular, the ability of AI to generate deepfake audio or video that seamlessly mimics a user's voice, facial expressions, mannerisms, etc., easily allows fraudsters to gain unauthorized access to user accounts. Current identity verification systems using biometric methods of authentication primarily use raw biometric data to authenticate a user, rendering users defenseless and vulnerable against such fraudulent attacks. As such, there is a unique need for a technical solution that improves the robustness of biometric signatures by minimizing the dependence on raw biometric data alone, which in turn strengthens account security and safeguards user information. Because identity verification is commonly required in near-real-time and in many parallel instances at scale, such as to facilitate retail transactions or authentication at events, a systematic and computer-based implementation is necessary that avoids the delay that would be introduced by manual security measures. Accordingly, there exists an underlying technical necessity for systems that are able to autonomously provide this capability.

Example implementations described herein provide a technical solution to this technical problem. Moreover, example embodiments overcome the challenges that arise by relying solely on raw biometric data for user authentication. Example embodiments described herein use a user biosignature generation system including a multimodal machine learning model. In response to the detection of a biosignature usage event, the user biosignature generation system blends user biometric data and metadata to generate a unique user biosignature that can be used to authenticate the user, and subsequently provide them with access or authorization. Further, example embodiments may iteratively train the multimodal machine learning model to update, optimize, and personalize the user biosignature based on the evolving biometric and metadata identifiers of the user. In addition, example embodiments described herein may be useful in a range of sectors (e.g., financial, healthcare, border security, etc.) and may be used by a variety of establishments (e.g., banks, hospitals, the U.S. Department of Homeland Security, etc.), wherein accurately identifying users is of great importance. Further, an establishment may use example embodiments described herein to streamline user authentication processes, thereby allowing establishments to enhance operational efficiency, while allowing users to gain quick access to accounts and services. Such establishments may also directly benefit from resource optimization, as the user biosignature system may be tailored to fit their specific security needs for seamless integration into their existing IT infrastructure.

In one example embodiment, a method is provided for generation of a user biosignature. The method includes extracting, by a mining engine, user data from a data environment, wherein the user data is associated with a user. The method further includes analyzing, by a smart engine and using a multimodal machine learning model, the user data, wherein the user data comprises one or more data types, wherein the one or more data types comprise at least metadata and biometric data. The method further includes determining, by the smart engine and using the multimodal machine learning model, a character classification associated with each of the one or more data types based on the analyzed user data, wherein the character classification comprises a primary character classification and a secondary character classification. The method further includes generating, by the smart engine and using the multimodal machine learning model, the user biosignature based on the determined character classification, and outputting, by communications hardware, the generated user biosignature.

In another example embodiment, an apparatus is provided for generation of a user biosignature. The apparatus includes a mining engine configured to extract user data from a data environment, wherein the user data is associated with a user. The apparatus further includes a smart engine configured to analyze, using a multimodal machine learning model, the user data, wherein the user data comprises one or more data types, wherein the one or more data types comprise at least metadata and biometric data. The smart engine is further configured to determine, using the multimodal machine learning model, a character classification associated with each of the one or more data types based on the analyzed user data, wherein the character classification comprises a primary character classification and a secondary character classification. The smart engine is further configured to generate, using the multimodal machine learning model, the user biosignature based on the determined character classification. The apparatus further includes communications hardware configured to output the generated user biosignature.

In another example embodiment, a computer program product is provided for generation of a user biosignature. The computer program product includes at least one non-transitory computer readable storage medium storing software instructions that, when executed, cause an apparatus to extract user data from a data environment, wherein the user data is associated with a user. The at least one non-transitory computer-readable storage medium storing software instructions that, when executed, further cause an apparatus to analyze, using a multimodal machine learning model, the user data, wherein the user data comprises one or more data types, wherein the one or more data types comprise at least metadata and biometric data. The at least one non-transitory computer-readable storage medium storing software instructions that, when executed, further cause an apparatus to determine, using the multimodal machine learning model, a character classification associated with each of the one or more data types based on the analyzed user data, wherein the character classification comprises a primary character classification and a secondary character classification. The at least one non-transitory computer-readable storage medium storing software instructions that, when executed, further cause an apparatus to generate, using the multimodal machine learning model, the user biosignature based on the determined character classification, and output the generated user biosignature.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
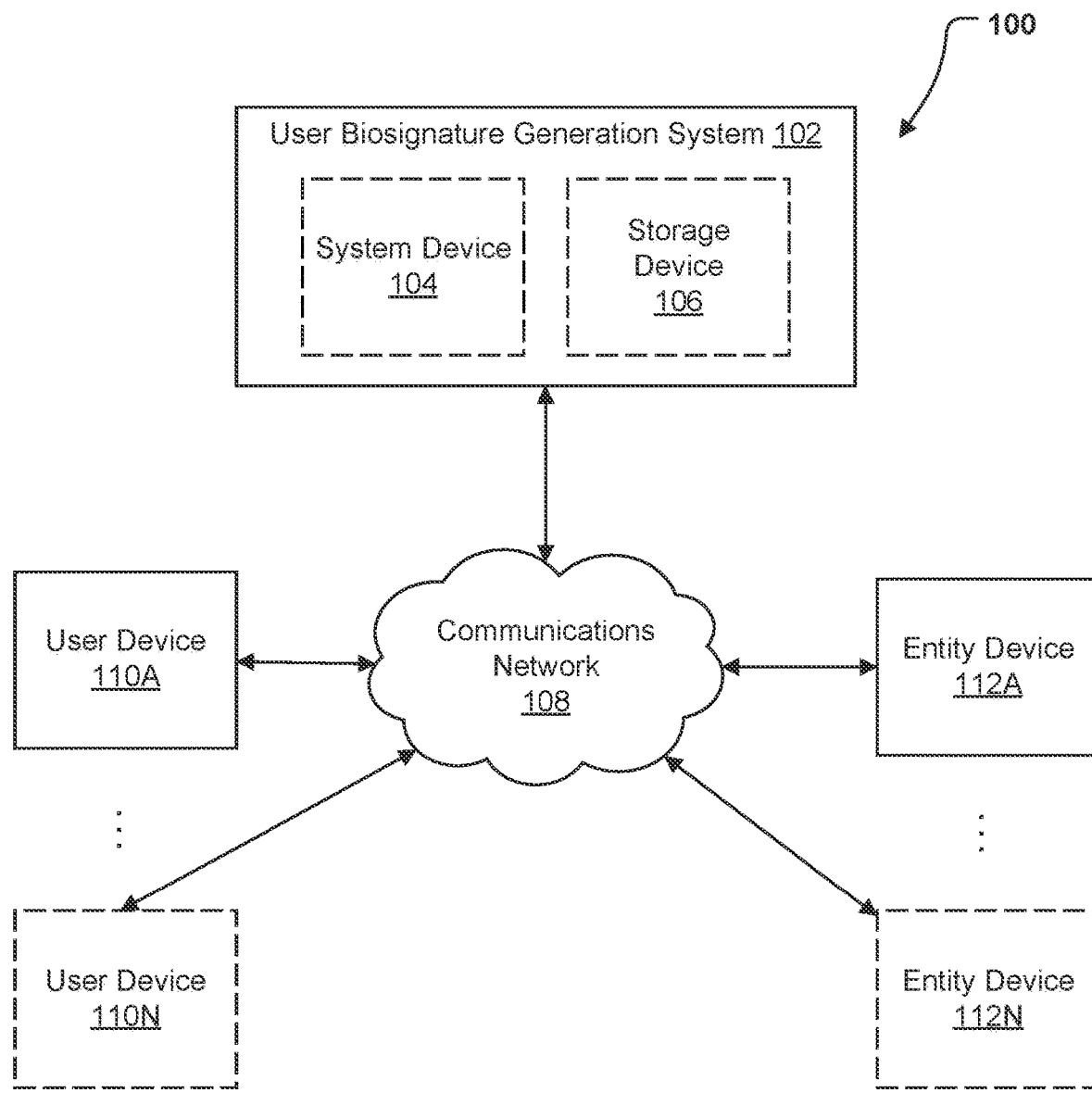
FIG. 1 illustrates a system in which some example embodiments may be used for generation of a user biosignature.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "user biosignature" refers to a sequence of characters (e.g., alphabets, numerals, special characters, etc.), wherein each character represents a particular data type (e.g., metadata or biometric data) comprising particular user attributes. The user biosignature may encompass a blend of evolving user attributes associated with the various data types to form a unique and multifaceted digital signature that is difficult to fake or spoof.

The term "user data" refers to any information or personal data associated with a user, such as identity information, contact information, financial information, online activity, in-person visits, communication history, authentication data, device information, consent records, and/or the like. In some embodiments, the user data may be extracted from a data environment in response to detecting a user visit event at an establishment.

The term "data environment" refers to a structured or unstructured collection of distinct digital contexts or repositories within which user-related information may be stored, processed, and managed. In some embodiments, the data environment may encompass various domains, such as online platforms, applications, databases, or interconnected systems. In some embodiments, a data environment may be accessed to retrieve user data.

The term "user attribute" refers to a specific user characteristic or attribute linked to a data type, specifically within the context of a user biosignature generation event. A user attribute may serve to encapsulate relevant information for generation of a user biosignature, such as an image, audio recording, transaction history, historical log-in events, keyboard stroke patterns, and/or the like.

The term "character sequence" refers to a unique combination of a primary character classification and secondary character classification for the one or more data types. In some embodiments, the character sequence may allocate a particular percentage of the sequence to represent a specific data type, intra-data type relationship, inter-data type relationship, and/or the like.

The term "user type" refers to the classification of individuals or entities interacting with the user biosignature generation system. In some embodiments, the "user type" may comprise categories such as "adult", "child", "teenager", "organization", and/or the like.

The term "extraction algorithm" refers to a systematic and computational procedure designed to selectively retrieve or isolate specific information or features from a given dataset or input (e.g., identified user type). In some embodiments, the extraction algorithm may be characterized by predefined rules, techniques, or methodologies aimed at identifying and extracting a targeted element (e.g., patterns, entities, structures, etc.) from the data environments.

The term "intra-data type relationships" s refers to associations or connections within a dataset, specifically involving elements of the same data type. In some embodiments, the one or more intra-data type relationships may be systematically identified or characterized based on predefined criteria or patterns, and may contribute to the organized understanding of interactions and dependencies among elements within a homogeneous data type.

The term "inter-data type relationships" refers to associations or connections between elements of different data types within a dataset. In some embodiments, the one or more inter-data type relationships may be systematically identified or characterized based on predetermined rules or criteria, and may facilitate the comprehensive analysis of interactions and dependencies between heterogeneous data types.

The term "qualitative difference" refers to distinctions between entities that involve non-numeric attributes, characteristics, or qualities. The qualitative difference may encompass variations in inherent nature, attributes, or properties that are not quantifiable.

The term "quantitative difference" refers to distinctions between entities that can be measured or expressed in numerical terms. The quantitative difference may involve variations in quantity, magnitude, or degree, allowing for quantitative comparisons based on measurable attributes.

The term "historical intra-data type relationships" refers to historical associations or historical connections within a historical dataset, specifically involving elements of the same data type. In some embodiments, the one or more historical intra-data type relationships may have been systematically identified or characterized based on predefined criteria or patterns, and may have contributed to the organized understanding of interactions and dependencies among historical elements within a homogeneous data type.

The term "historical inter-data type relationships" refers to historical associations or historical connections between elements of different data types within a historical dataset. In some embodiments, the one or more historical inter-data type relationships may have been systematically identified or characterized based on predetermined rules or criteria, and may have facilitated the comprehensive analysis of interactions and dependencies amongst historical elements of heterogeneous data types.

System Architecture

Example embodiments described herein may be implemented using any of a variety of computing devices or servers. To this end, FIG. 1 illustrates an example environment 100 within which various embodiments may operate. As illustrated, a user biosignature generation system 102 may receive and/or transmit information via communications network 104 (e.g., the Internet) with any number of other devices, such as one or more of user devices 110A-110N and/or entity devices 112A-112N. Although system device 104 and storage device 106 are described in singular form, some embodiments may utilize more than one system device 104, more than one storage device 106, and/or the like. The one or more user devices 110A-110N and the one or more entity devices 112A-112N may be embodied by any computing devices known in the art. The one or more user devices 110A-110N and the one or more entity devices 112A-112N need not themselves be independent devices, but may be peripheral devices communicatively coupled to other computing devices. A user device 110A-110N may include laptops, tablets, phones, whereas an entity device 112A-112N may be a device associated with an entity (e.g., organization) that performs functions related to data management, implementation of security measures, communication facilitations, and other operations specific to the needs of the particular entity.

The user biosignature generation system 102 may be implemented as one or more computing devices or servers, which may be composed of a series of components. These components of system device 104 may be physically proximate to the other components of the user biosignature generation system 102 while other components are not. The system device 104 may receive, process, generate, and transmit data, signals, and electronic information to facilitate the operations of the user biosignature generation system 102. Particular components of the user biosignature generation system 102 are described in greater detail below with reference to apparatus 200 in connection with FIG. 2.

In some embodiments, the user biosignature generation system 102 further includes a storage device 106 that comprises a distinct component from other components of the user biosignature generation system 102. Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the user biosignature generation system 102. Storage device 106 may store information relied upon during operation of the user biosignature generation system 102, such as various user data that may be used by the user biosignature generation system 102, data and documents to be analyzed using the user biosignature generation system 102, or the like. In addition, storage device 106 may store control signals, device characteristics, and access credentials enabling interaction between the user biosignature generation system 102 and one or more of the user devices 110A-110N or entity devices 112A-112N.

Although FIG. 1 illustrates an environment and implementation in which the user biosignature generation system 102 interacts indirectly with a user via one or more of user devices 110A-110N and/or entity devices 112A-112N, in some embodiments users may directly interact with the user biosignature generation system 102 (e.g., via communications hardware of the user biosignature generation system 102), in which case a separate user devices 110A-110N and/or entity devices 112A-112N may not be utilized. Whether by way of direct interaction or indirect interaction via another device, a user may communicate with, operate, control, modify, or otherwise interact with the user biosignature generation system 102 to perform the various functions and achieve the various benefits described herein.

Example Implementing Apparatuses

Figure 2:
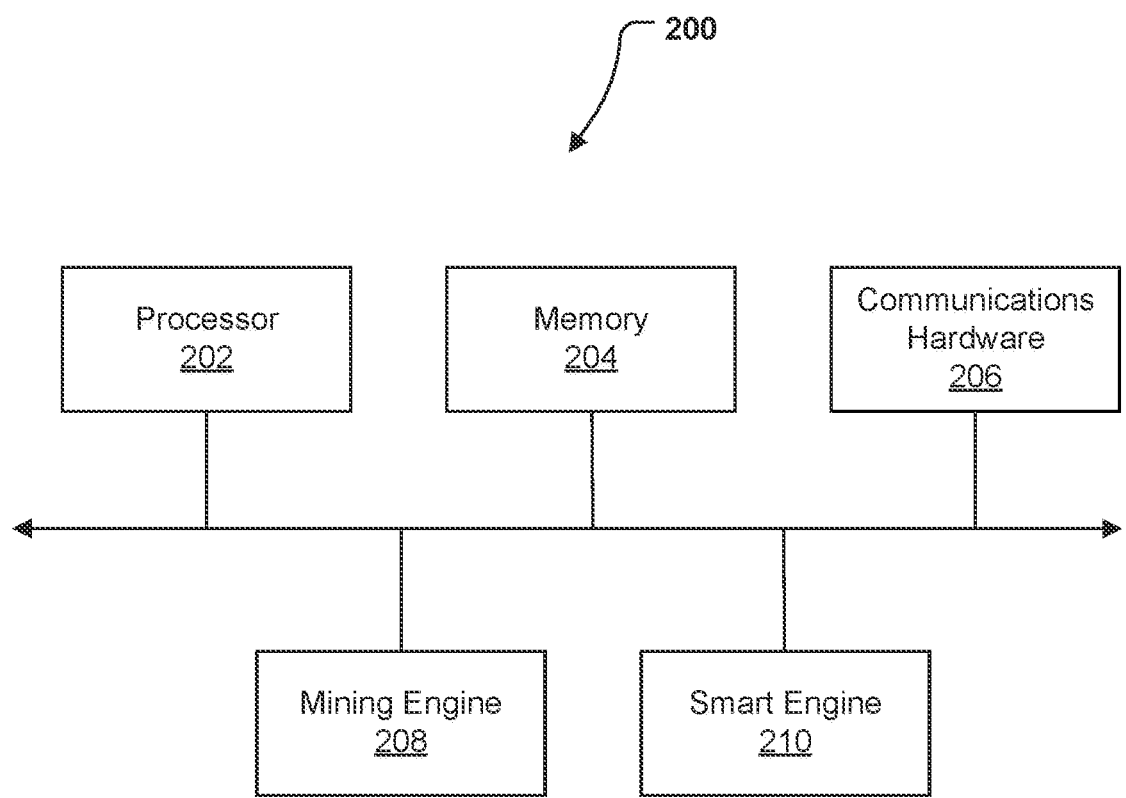
FIG. 2 illustrates a schematic block diagram of example circuitry embodying a system device that may perform various operations in accordance with some example embodiments described herein.

The user biosignature generation system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 3-7. As illustrated in FIG. 2, the apparatus 200 may include processor 202, memory 204, communications hardware 206, mining engine 208, and smart engine 210, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a mining engine 208 that extracts user data from a data environment. The mining engine 208 may utilize processor 202, memory 204, or any other hardware component included in the apparatus 200 to perform these operations, as described in connection with FIGS. 3-4 below. The mining engine 208 may further utilize communications hardware 206 to gather data from a variety of sources (e.g., user devices 110A-110N, entity devices 112A-112N or storage device 106, as shown in FIG. 1), and/or exchange data with a user, and in some embodiments may utilize processor 202 and/or memory 204 to identify a user type associated with the user.

In addition, the apparatus 200 further comprises a smart engine 210 that (i) analyzes, using a multimodal machine learning model, the user data, wherein the user data comprises one or more data types, wherein the one or more data types comprise at least metadata and biometric data, (ii) determines, using the multimodal machine learning model, a character classification associated with each of the one or more data types based on the analyzed user data, wherein the character classification comprises a primary character classification and a secondary character classification, and (iii) generates, using the multimodal machine learning model, the user biosignature based on the determined character classification. The smart engine 210 may utilize processor 202, memory 204, or any other hardware component included in the apparatus 200 to perform these operations, as described in connection with FIGS. 3 and 5-7 below. The smart engine 210 may further utilize communications hardware 206 to gather data from a variety of sources (e.g., user devices 110A-110N or entity devices 112A-112N, as shown in FIG. 1), and/or exchange data with a user, and in some embodiments may utilize processor 202 and/or memory 204 to classify the user data into the one or more data types, determine one or more intra-data type relationships and one or more inter-data type relationships for each of (i) the one or more data types, identify at least one quantitative difference for each of the one or more intra-data type relationships compared to one or more historical intra-data type relationships and each of (ii) the one or more inter-data type relationships compared to one or more historical inter-data type relationships, train a multimodal machine learning model, determine the primary character classification associated with each of the one or more data types, determine the secondary character classification associated with each of the one or more intra-data type relationships and one or more inter-data type relationships, determine a character sequence based on the primary character classification and the secondary character classification.

Although components 202-210 are described in part using functional language, it will be understood that the particular implementations necessarily include the use of particular hardware. It should also be understood that certain of these components 202-210 may include similar or common hardware. For example, the mining engine 208, and smart engine 210, may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "engine" with respect to elements of the apparatus therefore shall be interpreted as necessarily including the particular hardware configured to perform the functions associated with the particular element being described. Of course, while the term "engine" should be understood broadly to include hardware, in some embodiments, the term "engine" may in addition refer to software instructions that configure the hardware components of the apparatus 200 to perform the various functions described herein.

Although the mining engine 208 and smart engine 210 may leverage processor 202, memory 204, or communications hardware 206 as described above, it will be understood that any of mining engine 208 and smart engine 210 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that mining engine 208 and smart engine 210 comprise particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatuses 200, example embodiments are described below in connection with a series of flowcharts and schematic block diagrams.

Example Operations

Turning to FIGS. 3-7, example flowcharts and schematic block diagrams are illustrated that contain example operations implemented by example embodiments described herein. The operations illustrated in FIGS. 3-7 may, for example, be performed by system device 104 of the user biosignature generation system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, mining engine 208, smart engine 210, and/or any combination thereof. It will be understood that user interaction with the user biosignature generation system 102 may occur directly via communications hardware 206, or may instead be facilitated by a separate user device 110A-110N, as shown in FIG. 1, and which may have similar or equivalent physical componentry facilitating such user interaction.

Figure 3:
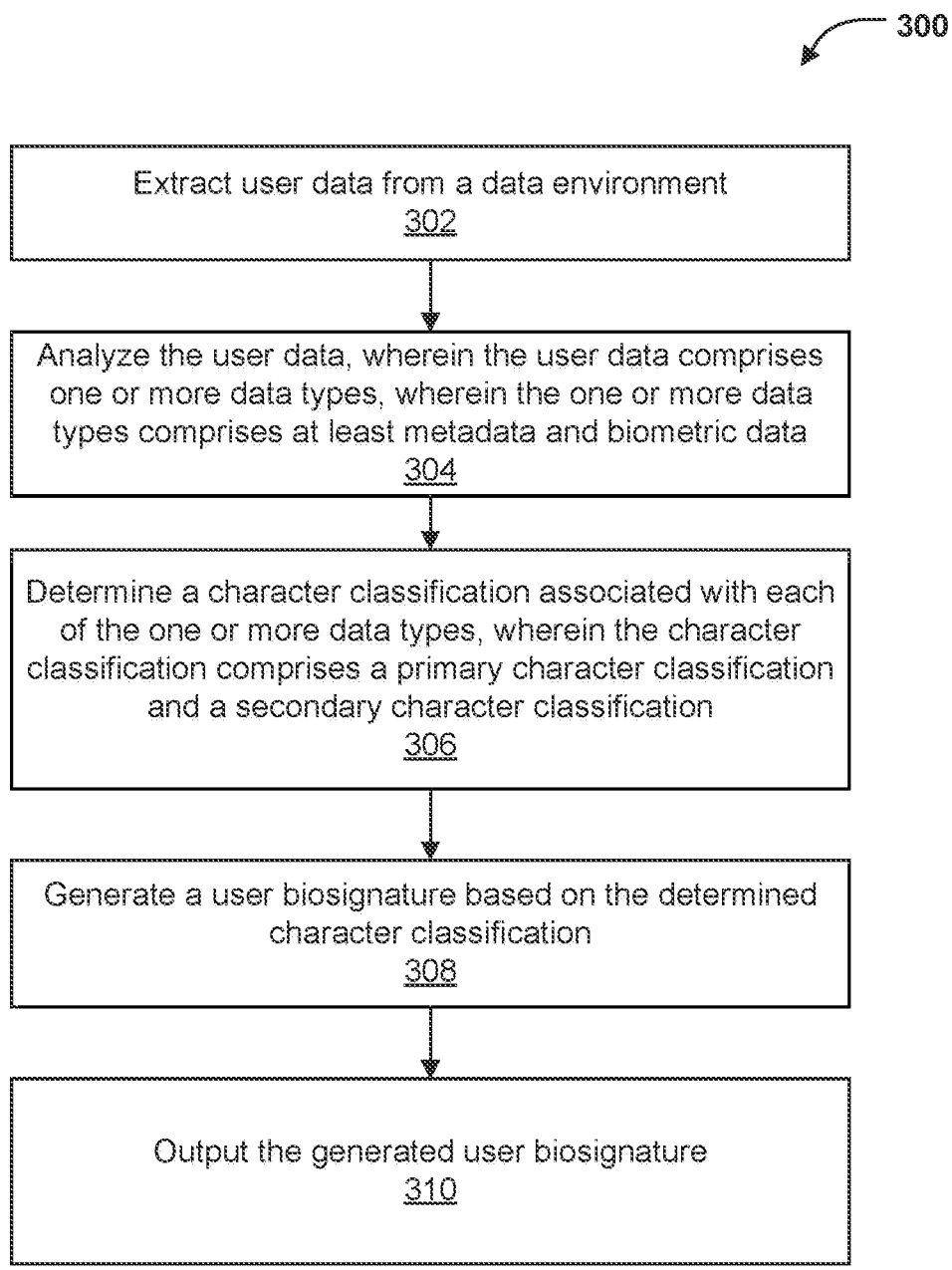
FIG. 3 illustrates an example flowchart for generation of a user biosignature, in accordance with some example embodiments described herein.

Turning first to FIG. 3, a procedure 300 illustrates example operations for generating a user biosignature. The apparatus 200 includes means such as processor 202, memory 204, communications hardware 206, mining engine 208, smart engine 210, or the like for generating a user biosignature. The user biosignature may be generated in response to the detection of a biosignature usage event. In some embodiments, the user biosignature may be adaptively generated as the user biosignature generation system 102 learns and evolves over time. In particular, adaptive generation recognizes that users may experience physiological changes and may thus adjust the multimodal machine learning model to accommodate such variations and other evolving characteristics. In some embodiments, the user biosignature may be dynamically generated by capturing and incorporating real-time variations in biometric and behavioral data. In particular, dynamic generation may take into account immediate changes in the user's physiological or behavioral characteristics, ensuring that the biosignature reflects the most current state of the user.

A biosignature usage event may refer to a specific occurrence or instance in which a user interacts with the user biosignature generation system 102. This event may be marked by the active or passive participation of the user in interacting with the user biosignature generation system, and the role of the user biosignature generation system 102 in detecting a biosignature usage event. Examples of biosignature usage events may include the following scenarios: (i) a user requesting access to electronic health records, (ii) a clinician verifying their identity before administering medication, (iii) a user attempting to access online banking, (iv) an investor verifying their identity for secure access to financial portfolios, (v) border personnel enhancing security during entry procedures, (vi) an employee entering a secure facility, (vii) executives accessing confidential information, (viii) a student requesting access to secure exam results or educational records, (ix) a faculty member requesting access to sensitive research data, (x) a smartphone owner attempting to unlock their device, (xi) a police officer requesting access to restricted databases, and/or the like.

In some embodiments, the mining engine 208 may operate an event triggering mechanism responsible for monitoring and detecting the occurrence of a biosignature usage event. The triggering criteria may be predefined by the system or by the user, and may be continuously refined based on evolving attributes associated with a biosignature usage event for a particular user. For instance, the multimodal machine learning model may learn to differentiate between normal biosignature usage events and instances where the user is under duress or forced to authenticate and interact with the user biosignature generation system 102. The user biosignature generation system 102 may also allow for dynamic adjustments to the triggering mechanism by adapting to changes in the user's behavior or environmental conditions. In some embodiments, if the user biosignature generation system 102 fails to detect a user biosignature usage event when it is actually occurring (false negative), communications hardware 206 may output a false negative prompt to the user that allows the user to provide feedback regarding the detection status (failed or successful) of the biosignature usage event. Conversely, in the instance in which the user biosignature generation system 102 detects a user biosignature usage event when it is not occurring (false positive), communications hardware 206 may output a false positive prompt to the user that allows the user to terminate operation 300.

In some embodiments wherein a biosignature usage event is detected by mining engine 208, communications hardware 206 may relay information about the detected biosignature usage event to the user biosignature generation system 102, thereby initializing operation 300. Further, data associated with the detected biosignature usage event, such as timestamps, user identifiers, and contextual data of the biosignature usage event, and/or the like may be stored in memory 204 for future retrieval or analysis. For instance, during a future biosignature usage event, the mining engine 208 may compare the gathered contextual data to the stored contextual data to determine whether the biosignature usage event is occurring (positive occurrence) or not occurring (negative occurrence).

In some embodiments wherein the mining engine 208 fails to detect a user biosignature usage event, communications hardware 206 may provide an interactive prompt using which the user may indicate that generation of a user biosignature is required. Upon receipt of the aforementioned indication, operation 300 may be initialized.

For example, in a scenario wherein a user seeks access to an online bank account, the mining engine 208 may detect the user's online presence and monitor their activity. If the user clicks a log-in button, the mining engine 208 may interpret this action as the user intending to gain access to their bank account, thereby identifying this occurrence as a biosignature usage event. In some embodiments, the mining engine 208 may be equipped with predefined scenarios that allow for accurate identification of biosignature usage events.

As shown by operation 302, the apparatus 200 includes means, such as mining engine 208 or the like, for extracting user data from a data environment, wherein the user data is associated with a user. Upon detection of a biosignature usage event, mining engine 208 deploys a data extraction algorithm that is configured to extract user data from a data environment. In some embodiments, the data extraction algorithm may implement a set of instructions that specify how to access, retrieve, store user data, and/or the like. In example embodiments, the data extraction algorithm may include parameters such as (i) data source locations (e.g., user authentication system logs, biometric database, internal organizational databases, cloud storage such as Google Cloud, API endpoints, file systems, social media platforms, etc.), (ii) data format specifications (e.g., JavaScript object notation (JSON), extensible markup language (XML), comma-separated values (CSV), database schema, etc.), (iii) predefined or dynamically evolving extraction criteria, and/or the like. In some embodiments, the data extraction algorithm may be deployed in real-time upon detection of the biosignature usage event. The set of instructions may be predefined by a system administrator, although in some embodiments a user may select and authorize the type of data to be extracted, and the data extraction algorithm might only be deployed after receiving such user authorization. For instance, accounting for situations where a user is a child, the data extraction algorithm used by the mining engine 208 might be designed to only extract user data in accordance with any child privacy laws or criteria set by a parent/guardian (e.g., a parent may choose not to have their child's images or audio data extracted). Further, in some embodiments, the mining engine 208 may, upon extraction of data, further anonymize that data to comply with applicable privacy regulations. The mining engine 208 may also execute an encryption algorithm or other privacy-preserving techniques in instances to enhance security of the extracted user data. In any event, the mining engine 208 may either deliver the extracted data to the smart engine 210 for analysis, or may store the extracted data in memory 204 for future retrieval or analysis.

In generating a user biosignature, the user device 110A-110N may extract user data using the various components of the user device (e.g., camera, audio recording system, GPS system, biometric sensors, and/or the like.). The componentry of the user device 110A-110N determines the type of data and user attributes that may be extracted. For instance, a user device 110A-110N may not be equipped with a camera, rendering it unable to extract biometric image data. However, if the user device 110A-110N is equipped with an audio recorder, the user device 110A-110N may extract the user's physiological voice markers, and generate the user biosignature using the user biosignature generation system 102. Metadata may be similarly extracted from network logs of the user device 110A-110N that record details of network connections (e.g., timestamps, IP addresses, and protocols).

In alternative embodiments, generating a user biosignature may involve an entity device 112A-112N extracting user data via the various components of the entity device (e.g., camera, audio recording system, biometric sensors, and/or the like). An entity may refer to one or more establishments that provide goods or services (e.g., business entity, organization, commercial entity) and require user biosignatures for authentication or authorization purposes. For example, in a scenario where a non-verbal patient must verify their identity before receiving treatment, an entity device 112A-112N (i.e., hospital device) with a camera may extract biometric image data comprising facial feature attributes and may also be equipped with biometric sensors (e.g., fingerprint scanners, iris scanners, etc.) to extract distinctive biometric user attributes (e.g., fingerprint ridges, iris shape/color, and/or the like). The hospital device may subsequently generate the user biosignature using the extracted user data.

User data may include biometric data (e.g., fingerprint patterns, facial features, voiceprints, iris or retina scans, etc.), metadata (e.g., timestamps, location data, device information, environmental conditions, etc.), behavioral biometrics (e.g., keystroke dynamics, gesture recognitions, etc.), health metrics (e.g., heartbeat patterns, gait recognition, etc.), financial information (e.g., transaction history, credit debt, etc.), previous log-in information, and/or the like. In instances where deployment of the data extraction algorithm fails to extract user data, the mining engine 208 may perform several steps to address the failure, including: (i) error logging and reporting (e.g., recording specific error messages and reasons for the failure, implementing an automated reporting mechanism to alert administrators or system operators about the extraction failure, etc.), (ii) retry mechanism (e.g., making additional attempts at extracting user data, introducing randomized delays between retries to account for potential temporary issues, etc.), (iii) alternative extraction techniques (e.g., implementing a fallback mechanism to switch to an alternative extraction method if the primary one fails, considering an alternative or complementary data extraction technique that may be more robust or suitable for a particular data environment, etc.), (iv) preprocessing steps (e.g., enhancing the quality of input data before extraction, addressing potential noise or inconsistencies that may hinder the extraction process), (v) dynamic parameter adjustment (e.g., dynamically adjust parameters of the data extraction algorithm based on feedback and analysis of failed attempts and optimizing the algorithm for different scenarios, etc.), and/or (vi) enhanced logging for analysis (e.g., capturing additional contextual information about the extraction environment, enabling post-failure analysis for continuous algorithm improvement), and/or the like.

In some embodiments, the mining engine 208 may calculate the period of time since the user data was last extracted to determine whether a new extraction of user data is necessary. For instance, if the data extraction algorithm is deployed on Jan. 2, 2024, it might not be deployed again until Jan. 3, 2024, if the likelihood of user data evolving within a day remains low. However, in an instance in which the mining engine 208 determines that extraction of user data is not necessary, the user may still be provided with an option to override this decision and force the deployment of the data extraction algorithm. This may be applicable in scenarios in which there are significant changes to a user's biometric data. By way of continued example, if the user has natural black hair on Jan. 2, 2024 but dyes their hair on Jan. 3, 2024, the user biosignature generation system 102 may determine that a new data extraction is not required based on the likelihood of the user data evolving, and may output an indication of this decision to the user. In this case, the user may choose to reject the decision and force the mining engine 208 to extract user data, as their biometric data must be updated to reflect the recent change to their physical appearance.

In some embodiments, operation 302 may involve identifying a user type associated with the user. In some embodiments, the preprocessing circuitry may preprocess the extracted user data prior to identifying a user type associated with the user. Preprocessing of the extracted user data may include: (i) data cleaning by identifying and handling missing or erroneous data in the historical user attribute set, (ii) normalization/scaling by standardizing numerical attributes to a common scale, thereby ensuring that all elements of the user data contribute equally to any subsequent analyses, (iii) feature engineering by modifying the extracted user data to enhance the information available for user type identification, (iv) outlier detection and handling to prevent them from disproportionately influencing the user type identification, (v) data encoding by converting categorical variables into a numerical format suitable for user type identification, (vi) dimensionality reduction, and/or the like. In instances in which an element of user data is identified as "missing" or "incomplete", the mining engine 208 may attempt to re-extract the particular element of the user data from a corresponding data environment.

Upon extraction of the user data, and following completion of any required preprocessing steps, the mining engine 208 may deploy a user type identification algorithm to select and transform relevant information from the user data and create a set of features that capture the characteristics for identifying user types. The user type identification algorithm may comprise a set of instructions that specify how to identify the user type, and may be used to identify demographic features (e.g., age, gender, location), communication patterns (e.g., frequency of interactions, preferred communication channels, nature of communication content), behavioral biometrics (e.g., typing speed, flight time, dwell time, gesture patterns, voice characteristics), temporal features (e.g., alterations in behavioral traits, shifts in biometric characteristics, evolution of communication patterns), sentiment analysis, and/or the like from the user data. In some embodiments, the mining engine 208 may use an age estimation model and/or a classification algorithm to identify user type features and categorize users into predefined categories related to (i) age: "adult", "child", "teenager", "senior", or the like. In some embodiments, the age ranges for a particular user type may be predefined, whereas in alternative embodiments, the age ranges may be adaptively developed based on ongoing extraction of user data, feedback, or changes in the user population interacting with the user biosignature generation system 102.

Returning to FIG. 3, as shown by operation 304, the apparatus 200 includes means, such as smart engine 210 or the like, for analyzing the user data, wherein the user data must comprise at least metadata and biometric data, and may further contain other data types. In various embodiments, the biometric data type and metadata data type may comprise some combination of the following user attributes: (i) a user ID (e.g., a unique identifier assigned to each user within the user biosignature generation system 102), (ii) timestamp (e.g., the date and time when a specific action or event associated with the user occurred), (iii) device information (e.g., device type, model, operating system, software versions), (iv) IP address, (v) session duration, (vi) device interaction history (e.g., a record of the user's interactions with specific devices, applications, services over time), and/or the like. In some embodiments, the biometric data type may comprise the following user attributes: (i) fingerprint minutiae (e.g., distinctive points, ridges, minutiae patterns), (ii) facial landmarks (e.g., eyes, nose, mouth), (iii) voiceprint features (e.g., pitch, tone, speech patterns, other unique characteristics), (iv) iris patterns (e.g., unique patterns within the iris of the user's eye), (v) hand geometry (e.g., measurements and features related to the size and proportions of the user's hand), (vi) retina scan data (e.g., unique characteristics extracted from the patterns of blood vessels in the user's retina), (vii) keystroke dynamics (e.g., typing speed, mouse movement patterns, rhythm, patterns of keystrokes when the user enters information), (viii) gait recognition metrics, and/or the like. In further examples, the blend of metadata and biometric data types and their corresponding user attributes may include: (i) behavioral data (e.g., gesture recognition, body language, etc.), (ii) communication data (e.g., textual data, email content, call logs, messaging history, communication frequency, sentiment analysis, etc.), (iii) location data (e.g., GPS coordinates, geolocation patterns, check-ins, etc.), (iv) temporal data (e.g., timestamps, time intervals between user actions, activity timelines, patterns of user behavior over specific periods, etc.), (v) health data (e.g., heartbeat patterns, sleep metrics, physical activity data, other health-related biometrics subject to user consent and compliance with privacy regulations, etc.), (vi) environmental data (e.g., ambient temperature, light conditions, noise levels, etc.), (vii) device interaction data (e.g., device usage patterns, application usage history, etc.), (viii) social media data (e.g., user activity on social media platforms, social connections, posts, likes, comments, etc.), (ix) financial data (e.g., transaction history, spending patterns, financial interactions, etc.), (x) biographical data (e.g., user name, age, gender, occupation), (xi) preferences and interests data (e.g., favorite genres, choices in various domains, etc.), (xii) sensor data (e.g., accelerometers, gyroscopes, environmental sensors, etc.), and/or the like.

Figure 4A:
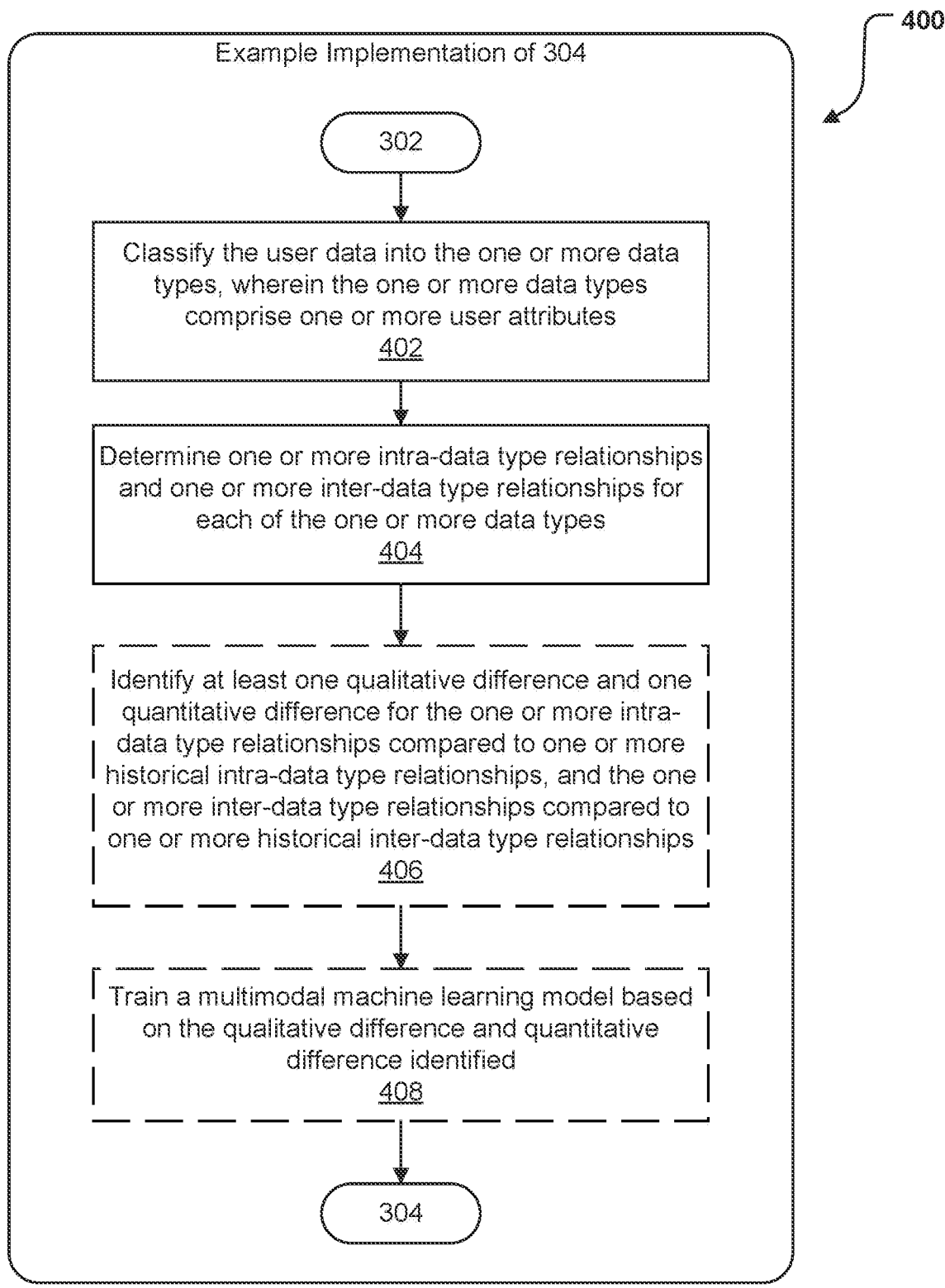
FIG. 4A illustrates another example flowchart for analyzing the user data, in accordance with some example embodiments described herein.

In some embodiments, one implementation of operation 304 is described in FIG. 4A. Turning now to FIG. 4A, a procedure 400 illustrates example operations for analyzing the user data, wherein the user data comprises one or more data types, wherein the one or more data types comprise one or more user attributes.

As shown by operation 402, the apparatus 200 includes means, such as smart engine 210 or the like, for classifying the user data into the one or more data types, wherein the one or more data types comprise one or more user attributes. The smart engine 210 may feed the extracted user data to a multimodal machine learning model that initializes the classifying operation. The multimodal machine learning model may operate in conjunction with the smart engine 210 to receive and appropriately classify multiple modalities of the extracted user data into one or more corresponding data types. In particular, the smart engine 210 may refer to a component that incorporates intelligent decision-making or adaptive capabilities that can involve rule-based systems, heuristics or machine learning. Further, the smart engine 210 may dynamically adjust parameters, weights, or strategies within the multimodal machine learning model based on changing conditions or user interactions with the user biosignature generation system 102, and may contribute contextual insights derived from non-modality specific information, providing additional context for the multimodal machine learning model to improve its classification accuracy.

Before initializing the classification operation, the smart engine 210 may deploy t a classification algorithm comprising a set of instructions that specify how to classify various modalities of user data. In some embodiments, the smart engine 210 may preprocess the raw user data via normalization to normalize textual data, resize and normalize images, standardize audio formats, handle video frame normalization, and/or the like. In some embodiments, the smart engine 210 may deploy a preprocessing algorithm that processes all extracted user data simultaneously, individually, or in unique groups based on specific predefined rules (e.g., images and videos may be processed together; however, images and audio may not be processed together). Following the completion of this preprocessing step, the smart engine 210 may feed the normalized user data to the multimodal machine learning model via communications hardware 206, thereby enabling the smart engine 210 to analyze the normalized data and develop modality-specific classifiers tailored to each data type. In some embodiments, the multimodal machine learning model may be a deep learning model that uses a neural network in order to classify multiple modalities simultaneously.

In some embodiments, the preprocessing step may not be required and the multimodal machine learning model may initialize the classifying operation by deploying various techniques to classify the one or more user attributes within the user data, and apply modality-specific classifiers to the user attributes in order to extract relevant features. For instance, the smart engine 210, in conjunction with the multimodal machine learning model may classify textual data using natural language processing (NLP) techniques, image data via optical character recognition (OCR) techniques or computer vision techniques, video data via object detection algorithms or video analysis libraries (e.g., OpenCV, FFmpeg), audio data via speech recognition or audio feature extraction techniques, and using multimodal classifying approaches for user data that is a combination of different modalities (e.g., an image with textual data may combine NLP and OCR techniques). The smart engine 210 may be equipped with mechanisms to handle errors (e.g., malformed syntax, unexpected patterns) when dealing with user attributes that may be noisy, incomplete, or inconsistent. In some embodiments, the smart engine 210 may implement rule-based classification if there are specific rules or patterns that need to be enforced during this process. Once the classifying operation is completed, the smart engine 210 may further analyze the classified user attribute using contextual analysis algorithms, pattern recognition algorithms, statistical analysis, semantic techniques, and/or the like, and subsequently associate a corresponding data type based on the analysis. In some embodiments, the smart engine 210 may organize the classified attributes into a structured format according to the identified data type, thereby making the user data easily accessible for future analysis and/or retrieval.

As shown by operation 404, the apparatus 200 includes means, such as smart engine 210, or the like for determining one or more intra-data type relationships and one or more inter-data type relationships for each of the one or more data types. Intra-data type relationships may be determined by intra-data type analyses. An intra-data type analysis involves examining relationships, patterns, and correlations between the same data type. For example, conducting an intra-data type analysis may involve exploring the relationship between biometric data: fingerprint and biometric data: eye color. The smart engine 210 may deploy one or more intra-data type analysis algorithms from memory 204 to perform intra-data type analyses. The intra-data type analysis algorithm may comprise a set of instructions that specify how to perform intra-data type analyses using, (i) descriptive statistics analysis, wherein user attributes within the same data type are analyzed to reveal patterns, central tendencies, variations (e.g., analyzing the correlation between eye distance and face width), (ii) time-series analysis, wherein changes to user attributes within the same data type are tracked over time to analyze trends or recurring patterns (e.g., analyzing the evolution of facial features as a person ages), (iii) distribution analysis, wherein the distribution of user attributes within the same data type are analyzed to identify the spread and concentration of particular characteristics (e.g., analyzing the correlation of between eye distance and the likelihood of the user requiring prescription glasses), and/or the like. The results of the intra-data type analyses may define the intra-data type relationships that may exist within a particular data type. The smart engine 210 may store the determined intra-data type relationships in memory 204.

Conversely, inter-data type relationships may be determined by inter-data type analyses. An inter-data type analysis involves examining relationships, patterns, and correlations between different data types. For example, conducting an inter-data type analysis may involve exploring the relationship between biometric data: eye attentiveness and metadata: log-in history. The smart engine 210 may deploy one or more inter-data type analysis algorithms from memory 204 to perform inter-data type analyses. The inter-data type analysis algorithm may comprise a set of instructions that specify how to perform inter-data type analyses using, (i) correlation analysis, wherein the statistical relationship between user attributes of different data types may be measured to determine how changes in one data type may correspond to changes in the other (e.g., examining the correlation between a user's fingerprint scan and timestamps of previous biometric updates), (ii) factor analysis, wherein underlying factors that may explain patterns observed across multiple data types are identified (e.g., investigating if there are underlying factors contributing to both biometric data and metadata), (iii) clustering analysis, wherein groups of similar user attributes are clustered based on multiple user data types (e.g., grouping user attributes based on certain features to identify distinct user segments), and/or the like. The result of the inter-data type analysis may define the inter-data type relationships that may exist between one or more data types. The smart engine 210 may store the determined inter-data type relationships in memory 204.

In some embodiments, the apparatus 200 includes means, such as smart engine 210, or the like, for generating a user attribute set based on the plurality of inter-data type relationships and intra-data type relationships determined. In some embodiments, the user attribute set may be generated by the smart engine 210 using one or more data structures. The smart engine 210 may select the one or more data structure types based on the data type of the one or more extracted user attributes and/or the determined inter-data type relationships and intra-data type relationships. For instance, if the smart engine 210 identifies a complex inter-data type relationship between biometric data: facial features and metadata: timestamps, the smart engine 210 may opt to generate the user attribute set using an image format. In some embodiments, the smart engine 210 may prioritize the selection of a user-friendly data structure, or a data structure that would be most compatible for use with subsequent operations. The smart engine 210 may deploy a data structure formatting algorithm comprising instructions on how to process the inter-data type relationships and intra-data type relationships in order to determine the optimal data structure. Examples of data structures may include: (i) a hierarchical data structure, wherein each inter-data type relationship or intra-data type relationship is a node, under which various user attributes may be organized, (ii) a tabular data structure, wherein each row may correspond to a particular inter-data type relationship or intra-data type relationship, and each column may represent a description of the determined relationship, (iii) a graph data structure, wherein the nodes represent the user attributes and the edges represent the corresponding inter-data type relationships, (iv) a relational database model, wherein individual tables are generated to represent the inter-data type relationships and intra-data type relationships, and/or the like. In some embodiments, the generated user attribute set may comprise all user attributes and the associated inter-data type relationships and intra-data type relationships. Alternatively, in some embodiments, the smart engine 210 may generate a user attribute set with a subset of the user attributes and a subset of the associated inter-data type relationships and intra-data type relationships, particularly in instances where it is important to include specific relationship types.

As shown by operation 406, the apparatus 200 includes means, such as smart engine 210, or the like for identifying at least one qualitative difference and at least one quantitative difference for each of (i) the one or more intra-data type relationships compared to one or more historical intra-data type relationships, and each of (ii) the one or more inter-data type relationships compared to one or more historical inter-data type relationships. The at least one qualitative difference and the at least one quantitative difference may be used by the smart engine 210 to subsequently train the multimodal machine learning model in order to iteratively update and optimize the model to generate a unique user biosignature based on evolving identifiers of the user. In some embodiments, the smart engine 210 may determine whether a user is interacting with biosignature system 102 for the first time. In some embodiments, operation 406 may not occur in an instance a user interacts with the user biosignature generation system 102 for the first time. In this case, the user biosignature generation system 102 may directly proceed to operation 306.

In the instance the smart engine 210 detects that a user is interacting with the biosignature generation system 102 at a time after the first time, the smart engine 210 may trigger the communications hardware 206 to extract available historical intra-data type relationships and/or inter-data type relationships stored in memory 204. Upon retrieving this information, the smart engine 210 may deploy a plurality of qualitative analysis algorithms and/or quantitative analysis algorithms that contain instructions for performing analyses comparing the one or more intra-data type relationships against one or more corresponding historical intra-data type relationships, and comparing the one or more inter-data type relationships against one or more corresponding historical inter-data type relationships. In some embodiments, the qualitative analysis algorithms may use the following methods: (i) sentiment analysis to evaluate textual data and discern changes in user sentiment or opinions, providing insights into evolving attitudes, (ii) topic modeling via Latent Dirichlet Allocation (LDA) to identify and compare topics present in historical and current data, revealing shifts in focus or emerging themes, (iii) image recognition and analysis to identify the introduction of new visual elements or alterations in image content over time, (iv) user interaction heat maps to determine changes in user engagement patterns that highlights areas of increased or decreased focus within interfaces, and/or the like. In some embodiments, the quantitative analysis algorithms may use the following methods: (i) regression analysis to determine how certain variables influence the relationship types, (ii) clustering analysis to categorize data points based on similarities and identify quantitative changes in the structure or composition of the relationships over different type periods, (iii) anomaly detection techniques that highlight unusual patterns or deviations from historical norms, aiding with the identification of quantitative outliers, (iv) network analysis by analysis network structures and relationships between entities to quantify changes in connectivity or centrality over time periods, (v) geospatial analyses that quantify changes in the distribution or density of activities, providing insights into how spatial aspects of certain relationships evolve over time, (vi) feature importance that identifies which variables have gained or lost significance in predicting outcomes within certain relationship types, and/or the like. Based on the at least one qualitative difference and the at least one quantitative difference identified, the smart engine 210 may update user data accordingly in memory 204 to reflect the most recent user attributes. The smart engine 210 may also feed the identified differences to a multimodal machine learning model for model training.

As shown by operation 408, the apparatus 200 includes means, such as smart engine 210, or the like for training a multimodal machine learning model based on the at least one qualitative difference and the at least one quantitative difference for each of (i) the one or more intra-data type relationships compared to one or more historical intra-data type relationships, and each of (ii) the one or more inter-data type relationships compared to one or more historical inter-data type relationships. In some embodiments, the user biosignature generation system 102 may train and use one multimodal machine learning model for generating user biosignatures for multiple users. However, in some embodiments, the user biosignature generation system 102 may train and use a personalized multimodal machine learning model for each user. In either case, the smart engine 210 may use a multimodal machine learning model training framework 452 as displayed in FIG. 4B to train a multimodal machine learning model.

Figure 4B:
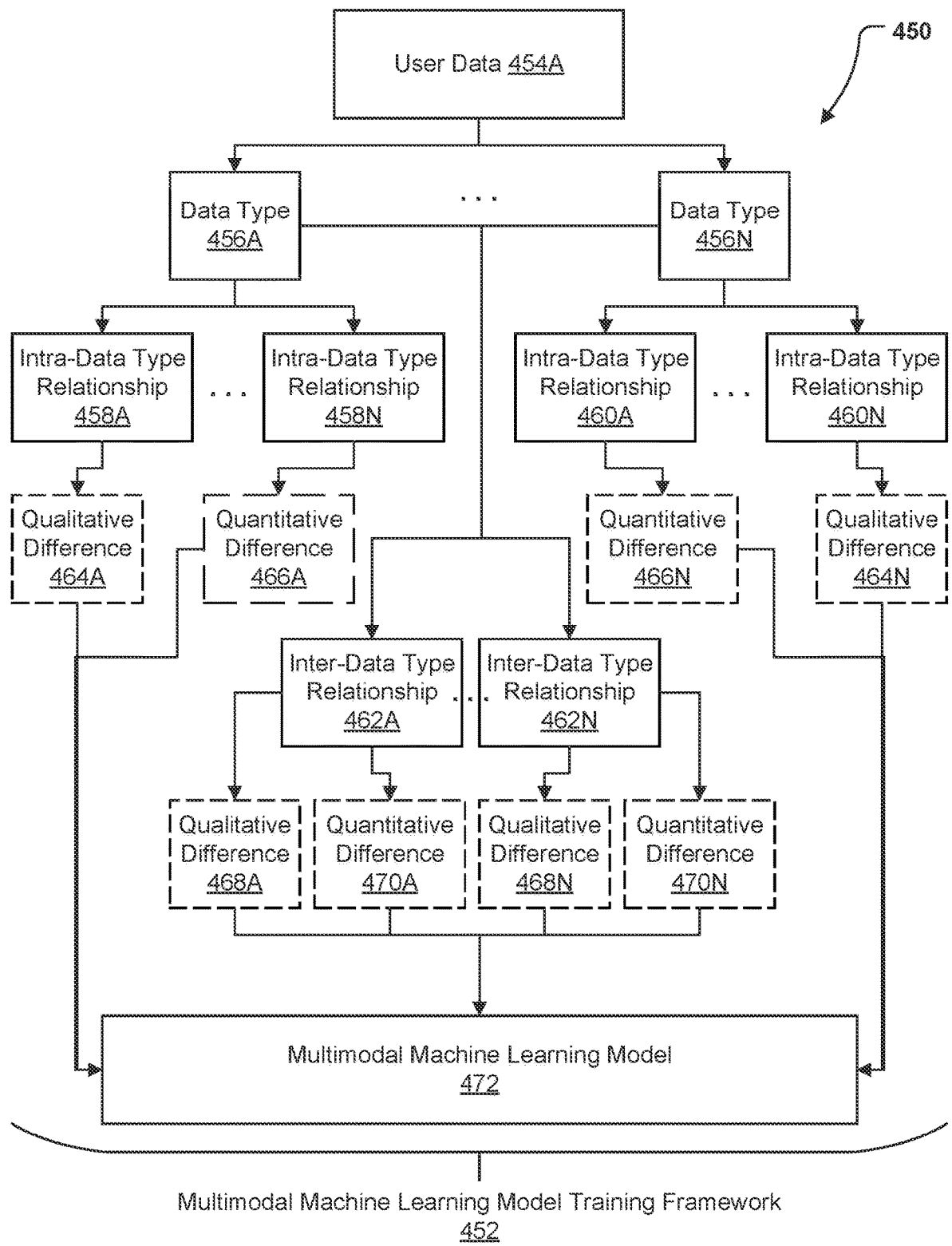
FIG. 4B illustrates a schematic block diagram for training a multimodal machine learning model, in accordance with some example embodiments described herein.

FIG. 4B illustrates a schematic block diagram illustrating an example operational flow 450 using the multimodal machine learning model training framework 452. As shown in FIG. 4B, the mining engine 208 extracts user data 454A from the data environments in accordance with operation 302. Following this step, the smart engine 210 may classify the user data into different data types 456A-456N in accordance with operation 402 and determine one or more intra-data type relationships 458A-458N for data type 456A, and/or one or more intra-data type relationships 460A-460N for data type 456N. Similarly, the smart engine 210 may further determine one or more inter-data type relationships 462A-462N between data type 456A-456N. In some embodiments, wherein the user interacts with the user biosignature generation system 102 for the first time, identifying the at least one qualitative difference 464A-464N and the at least one quantitative difference 466A-466N for the one or more intra-data type relationships 458A-458N of data type 465A and the one or more intra-data type relationships 460A-460N of data type 456N may not be performed. Similarly, in some embodiments, wherein the user interacts with the user biosignature generation system 102 for the first time, identifying the at least one qualitative difference 468A-468N and the at least one quantitative difference 470A-470N for the one or more inter-data type relationships 462A-462N between data type 456A-456N may not be performed. In this case, the smart engine 210 may train the multimodal machine learning model 472 using the determined intra-data type relationships 458A-458N for data type 456A, the determined intra-data type relationships 460A-460N for data type 456N, and the determined inter-data type relationships 462A-462N.

In instances wherein the user interacts with the user biosignature generation system 102 at a recurring time, the smart engine 210 may identify the at least one qualitative difference 464A-464N and the at least one quantitative difference 466A-466N for the one or more intra-data type relationships 458A-458N of data type 465A and the one or more intra-data type relationships 460A-460N of data type 456N, in order to train the multimodal machine learning model 472. Similarly, in some embodiments, wherein the user interacts with the user biosignature generation system 102 at a recurring time, the smart engine 210 may identify the at least one qualitative difference 468A-468N and the at least one quantitative difference 470A-470N for the one or more inter-data type relationships 462A-462N between data type 456A-456N, in order to train the multimodal machine learning model 472.

Upon receiving input from the smart engine 210, the multimodal machine learning model may be trained as follows: (i) data preprocessing wherein the smart engine 210 cleans and preprocesses at least one or more of the determined inter-data type relationships and intra-data type relationships and/or the at least one or more quantitative difference and the at least one or more qualitative difference identified for each of the one or more inter-data type relationships and intra-data type relationships determined, (ii) feature engineering wherein the smart engine 210 may create or extract features that may be relevant for generating a user biosignature, (iii) splitting the data wherein the smart engine 210 may divide the engineered dataset into a training set and testing set, (iv) selecting an appropriate machine learning algorithm (e.g., support vector machines, random forests, deep learning neural networks, k-means clustering, principal component analysis, hidden Markov models, gradient boosting machines), (v) training the multimodal machine learning model using the training data, (vi) evaluating the model's performance using the testing dataset, (vii) fine-tuning the model's hyperparameters depending on the chosen machine learning algorithm, etc. In some embodiments, the multimodal machine learning model may also be trained upon a dictionary comprising predefined character denotations for the one or more data types and the one or more inter-data type relationships and the one or more intra-data type relationships.

Returning to FIG. 3, as shown by operation 306, the apparatus 200 includes means, such as smart engine 210, or the like for determining a character classification associated with each of the one or more data types based on the analyzed user data, wherein the character classification comprises a primary character classification and a secondary character classification. Character classification may refer to the systematic classification of elements within the user data, based on the one or more user data types, one or more user attributes, the one or more inter-data type relationships, the one or more intra-data type relationships, and/or the at least one qualitative difference and the at least one quantitative difference identified for the one or more inter-data type relationships and the one or more intra-data type relationships. A character may refer to numerical digits, alphabetical letters, special symbols, custom encodings, and/or the like. In particular, primary character classification may refer to the distinctive characters that may be systematically assigned based on the unique association between the one or more data types and the one or more user attributes. For example, in some embodiments wherein the one or more data types comprise biometric data, the biometric data may encompass an image user attribute and an audio user attribute. Accordingly, the user biosignature generation system 102 may determine a primary character classification of A1 to represent the biometric data: image user attribute, and may determine a primary classification of A2 to represent the biometric data: audio user attribute. Alternatively, secondary character classification may refer to unique character repetition patterns associated with intra-data type relationships and/or inter-data type relationships. For example, in some embodiments wherein an intra-data type relationship exists between biometric data: image and metadata: transaction history, the user biosignature generation system 102 may accordingly determine a character repetition pattern of A1B1 to represent this intra-data type relationship.

Figure 5:
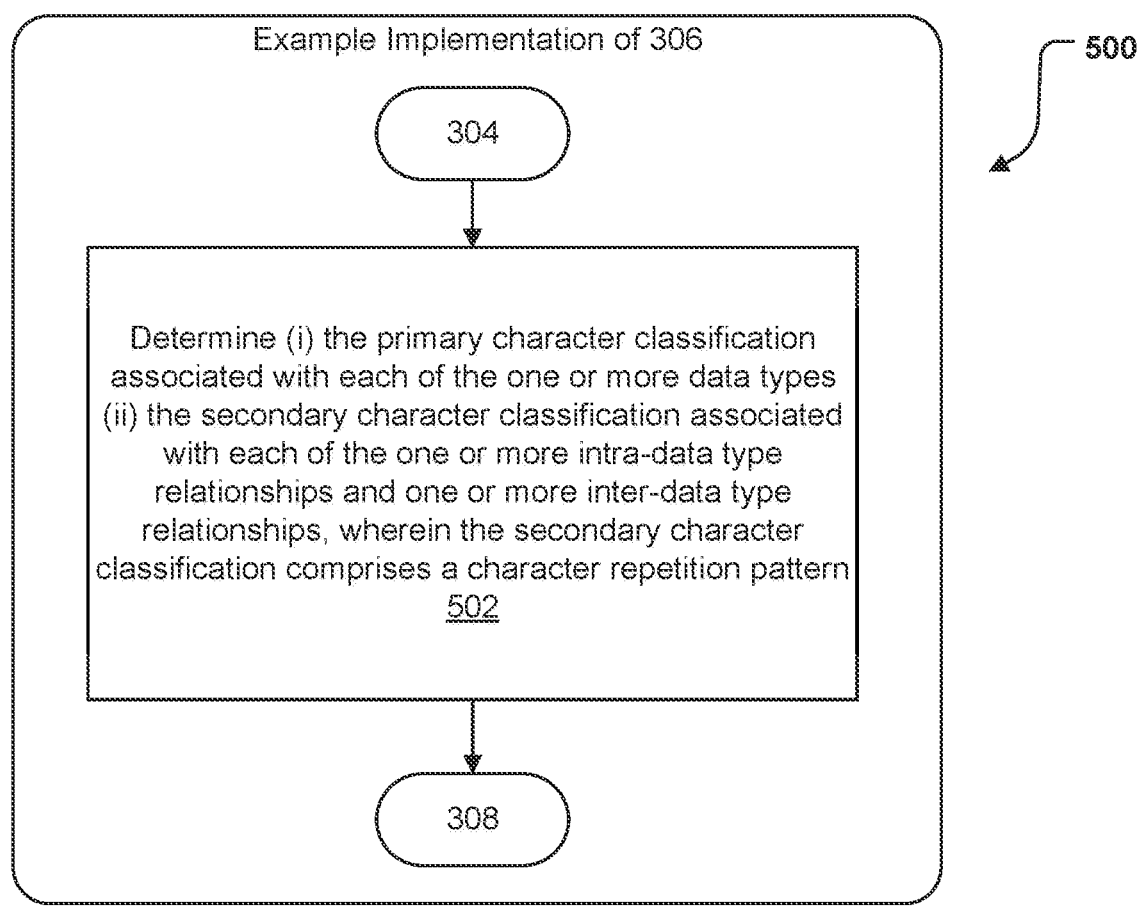
FIG. 5 illustrates another example flowchart for determining a character classification associated with each of the one or more data types, in accordance with some example embodiments described herein.

In some embodiments, operation 306 may be performed in accordance with the operations described in FIG. 5. Turning now to FIG. 5, a procedure 500 illustrates example operations for determining a character classification associated with each of the one or more data types based on the analyzed user data, wherein the character classification comprises a primary character classification and a secondary character classification.

As shown by operation 502, the apparatus 200 includes means, such as smart engine 210, or the like for determining (i) the primary character classification associated with each of the one or more data types and (ii) the secondary character classification associated with each of the one or more intra-data type relationships and one or more inter-data type relationships, wherein the secondary character classification comprises a character repetition pattern. In some embodiments, the communications hardware 206 may feed the classified user data and the determined intra-data type relationships and inter-data type relationships to the multimodal machine learning model that may have been stored in memory 204. In other embodiments, the smart engine 210 may already be in possession of the classified user data and the determined intra-data type relationships and inter-data type relationships following operation 404, 406, or 408. In embodiments wherein the smart engine 210 is an internal component of the multimodal machine learning model, the aforementioned information may already be fed to the multimodal machine learning model. However, in embodiments wherein the smart engine 210 is an external component, the aforementioned information must be fed by the smart engine 210 via communications hardware 206 to the multimodal machine learning model. The multimodal machine learning model may match a user data type, inter-data relationship, and/or intra-data relationship with the appropriate character denotations, based on the character denotations defined in the dictionary the multimodal machine learning model may have been trained upon. In some embodiments, the multimodal machine learning model may not have been trained with a character dictionary and may randomly generate character denotations for the user data types, inter-data type relationships, and/or intra-data type relationships based on the specific needs of a user or evolving characteristics of their user profile. For instance, if user X suffers from a genetic condition (e.g., progeria) that causes their biometrics to evolve at a quicker rate than considered normal, the smart engine 210 may recognize that a significant difference exists between the user's current and historical biometric data. If the multimodal machine learning model typically operates by increasing an iteration of the character repetition pattern for every difference detected, the smart engine 210 may determine that doing the same under these circumstances may be inefficient, as the multimodal machine learning model would generate a lengthy biosignature. However, over time, the multimodal machine learning model may be trained to detect such nuances and generate unique character classifications accordingly. By way of continued example, the model may not increase an iteration of the character repetition pattern for every difference detected between the user's current and historical biometric data.

Returning to FIG. 3, as shown by operation 308, the apparatus 200 includes means, such as smart engine 210, or the like for generating the user biosignature based on the determined character classification. The biosignature may comprise a character sequence including the unique characters denoting all of the primary character classifications and any secondary character classifications. As mentioned previously, the unique characters may comprise numerical digits, alphabetical letters, special symbols, custom encodings, and/or the like.

Figure 6:
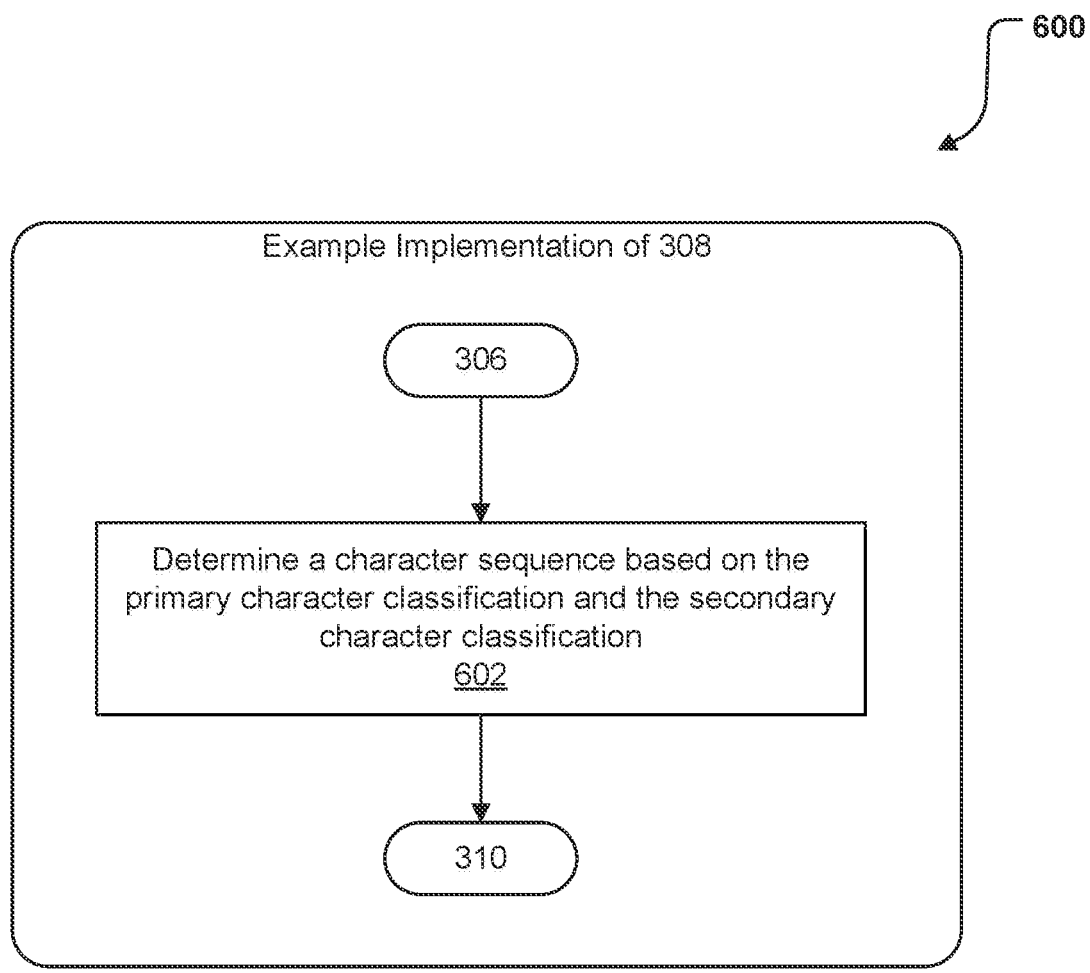
FIG. 6 illustrates another example flowchart for generating the user biosignature based on the determined character classification, in accordance with some example embodiments described herein.

In some embodiments, operation 308 may be performed in accordance with the operations described in FIG. 6. Turning now to FIG. 6, a procedure 600 illustrates example operations for generating the user biosignature based on the determined character classification.

As shown by operation 602, the apparatus 200 includes means, smart engine 210, or the like for determining a character sequence based on the primary character classification and the secondary character classification. In some embodiments, the character sequence may be determined by all the data types included in the primary character classification and their corresponding secondary character classification. For example, if the primary character classification included biometric data: images (A1), metadata: timestamps (B1), biometric data: audio (A2), and behavioral patterns (C1), the character sequence may be generated as including 50% biometric data: images, 10% metadata: timestamps, 15% biometric data: audio, and 25% behavioral patterns. Accordingly, the character sequence may be based entirely on the primary character classification (e.g., e A1A2C1B2). However, in some embodiments the character sequence may also include the secondary character classification. For example, if the determined intra-data type relationship between A1 and A2 is characterized as a particular value that is denoted by two repetitive patterns, the character sequence may be A1A1A2A2C1B2 or A1A2A1A2C1B2, or the like. Similarly, if the determined inter-data type relationships between C1 and A1 is characterized as a particular value that is denoted by three repetitive patterns, the character sequence may be A1A2C1C1C1B2B2B2, A1A2B2B2C1B2B2C1, or the like. In some embodiments, the character sequence may only include a sub-selection of data types from the primary character classification and a sub-selection of the corresponding secondary character classification. By way of continued example, the character sequence may just be A1B1, even if the primary character classification included behavioral pattern data.

In some embodiments, the smart engine 210 may deploy a generative algorithm to perform subsequent operations based on the determined character sequence. The generative algorithm may store instructions of various generative techniques for generating the character sequence. Examples of such generative techniques may include: (i) embedding layers, wherein each character of primary character classification and the secondary character classification gets represented as a vector, and combining these vectors creates a feature vector for both the primary and secondary character classification, (ii) Variational Autoencoders (VAEs) or Generative Adversarial Networks (GANs) that generate novel character sequences, (iii) attention mechanisms that may enable the multimodal machine learning model to selectively attend to specific parts of the input combination while generating the character sequence, (iv) performing a neural architecture search to find an optimal neural network architecture and hyperparameters that are optimized for generating diverse and unique character sequences, (v) ensemble methods with varied architectures or hyperparameters, (vi) integrating diversity regularization terms in the model's training objectives that penalize similarity between the generated character sequence and a historical character sequence, (vii) conditional generation of a character sequence based on specific conditions or constraints, and/or the like. Using one or more of the aforementioned techniques, the multimodal machine learning model in conjunction with the smart engine 210 may generate a character sequence, wherein the character sequence is indicative of the user biosignature.

Returning to FIG. 3, as shown by operation 310, the apparatus 200 includes means, such as communications hardware 206, or the like for outputting the generated user biosignature. In some embodiments, outputting the generated user biosignature may involve updating a user biosignature profile associated with the user based on the generated user biosignature, wherein the user biosignature profile comprises the user biosignature and one or more historical user biosignatures. A user biosignature profile may refer to a comprehensive digital record that includes a generated user biosignature and one or more historical user biosignatures associated a specific user. The one or more historical user biosignatures may refer to the past and archived user biosignatures from previous biosignature usage events. The inclusion of historical user biosignatures extends the user biosignature profile to encompass a temporal dimension and provide a structural repository of evolving user attributes over time. Upon generation of the user biosignature, the smart engine 210 may store the generated user biosignature in a biosignature profile associated with the user. The biosignature profile may be hosted by the apparatus 200, in which case the smart engine 210 may store it in memory 204 as part of the user biosignature profile. Additionally, or alternatively, the biosignature profile may be hosted remotely from the apparatus 200, in which case communications hardware 206 may receive the generated user biosignature from the smart engine 210 and distribute it to the remote storage location (e.g., a separate storage device 106 managed by the user biosignature generation system 102).

In some embodiments, outputting the generated user biosignature may involve the smart engine 210 deploying an output algorithm comprising a set of instructions that specify how to output the user biosignature to a particular location. In instances wherein the user biosignature is generated by the user device 110A-110N, the user biosignature may be outputted to the user (e.g., to user device 110A-110N) and/or may be directly outputted to an entity device 112A-112N from user device 110A-110N. In alternative embodiments, the user biosignature may be outputted to a remote server or to a server hosted by an entity device 112A-112N. In general, the output location of the generated user biosignature depends on the type of biosignature usage event that may occur and the type of device (user device 110A-110N, entity device 112A-112N, or the like) that generates the user biosignature. Communications hardware 206 may be programmed to output the generated user biosignature by identifying a destination location based on the particular biosignature usage event and communicating with componentry of the destination location through secure channels to establish a transmission pathway. In some embodiments, the communications hardware 206 may use industry-standard authentication protocols, such as OAuth, OpenID, and/or the like that define how the communication between the location of the generated user biosignature and the destination of the generated user biosignature should take place. In some embodiments, the communications hardware 206 may establish secure channels using encryption methods such as secure sockets layer (SSL) and/or transport layer security (TLS), ensuring that the user biosignature is transmitted securely, thereby protecting it from unauthorized access or tampering during the output process.

In some embodiments, the communications hardware 206 may output the user biosignature in real-time or near-real time following the generation of the user biosignature. In other embodiments, the communications hardware 206 may not output the user biosignature and may instead store the user biosignature in memory 204. This may occur in instances of technical failures, or if there are privacy or security concerns related to a particular user (e.g., a blacklisted or frozen bank account), in which providing further access may be detrimental to the user and/or the entity.

In some embodiments, the user biosignature may undergo an encoding process that ensures standardization and compatibility between the generating device and the bank device. Further, in some embodiments, the communications hardware may employ tokenization techniques to further enhance security of the user biosignature during transmission. This may involve replacing the user biosignature with a unique token identifier to prevent unauthorized interception of the sensitive data that the user biosignature comprises of and represents.

Figure 7:
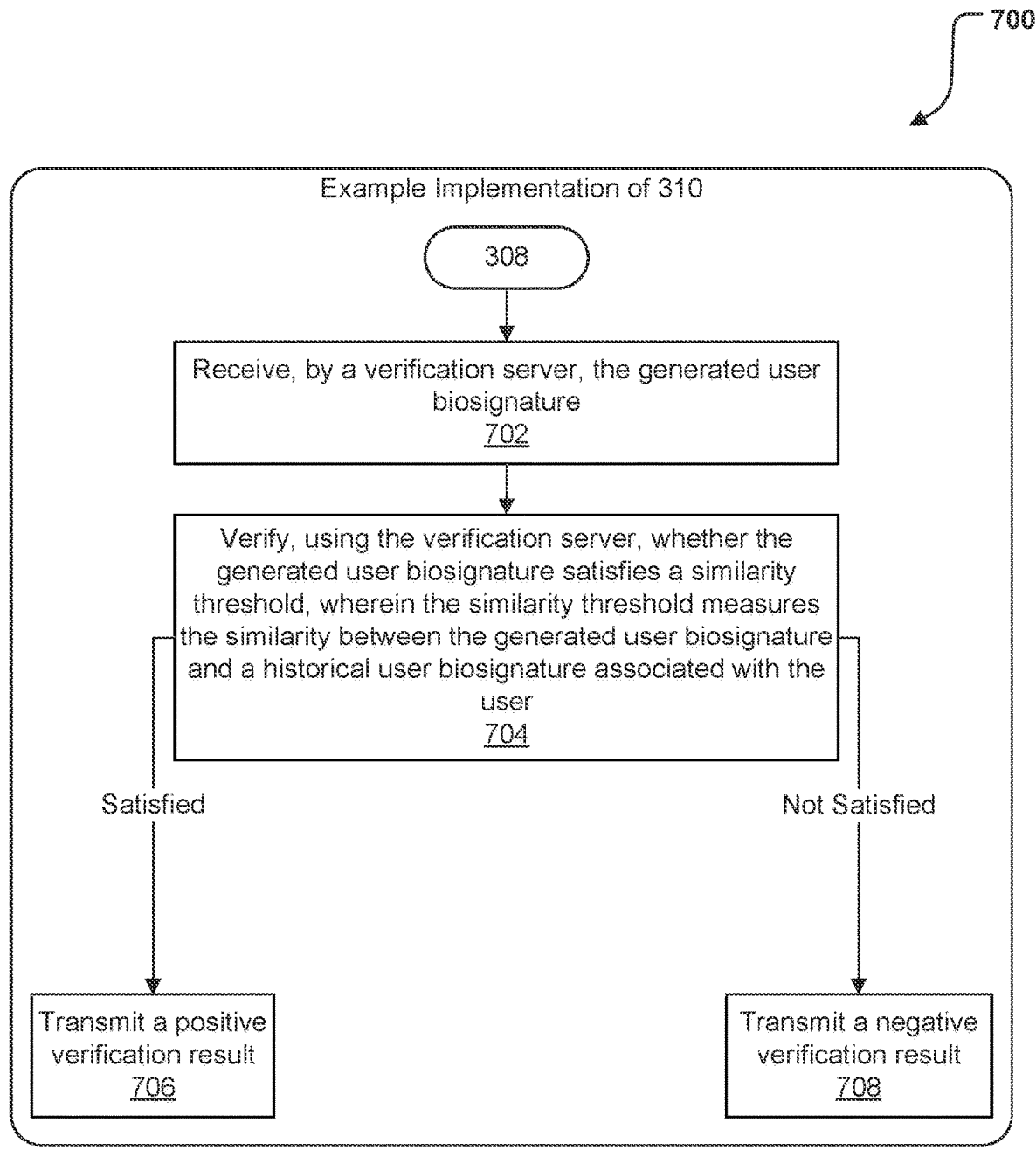
FIG. 7 illustrates another example flowchart for outputting the generated user biosignature, in accordance with some example embodiments described herein.

Turning now to FIG. 7, an example implementation illustrates operation 310 for a biosignature usage event wherein a user seeks access to an online bank account. The user biosignature generation system 102 referenced in connection with FIG. 7 may be the same user biosignature generation system 102 as described previously in connection with FIGS. 3-6 or a different user biosignature generation system 102. The apparatus 200 referenced in connection with FIG. 7 may be the same apparatus 200 as described previously in connection with FIGS. 3-6 or a different apparatus 200.

As illustrated in FIG. 7, the communications hardware 206 may output the generated user biosignature to the verification server responsible for authenticating the user and providing them with access to the bank account. In some embodiments, the verification server may be hosted by the user device 110A-110N (e.g., a user might run a local server to host a personal website or share files within their home network), entity device 112A-112N (e.g., hosting company websites, managing internal databases, providing shared resources for employees within the organization, etc.), whereas in other embodiments, the verification server may be hosted remotely (e.g., via cloud computing). FIG. 7 exemplifies a scenario wherein the verification server is hosted by an entity device 112A-112N.

As shown by operation 702, the apparatus 200 includes means, such as communications hardware 206, smart engine 210, or the like, for receiving the generated user biosignature. An entity device 112A-112N, which in this scenario may be a bank device, may receive the generated user biosignature for verification. In some embodiments, the bank device may receive a verification request from the device that generated the user biosignature. Although the verification request may itself include the user biosignature linked to a particular user, in some embodiments the verification request may involve the communications hardware 206 procuring the user biosignature (e.g., by providing a link to a storage location of the generated user biosignature). Either way, the verification request must provide the user biosignature and user identifying information (e.g., name of the related user), or a means of accessing the same. For instance, the verification request may indicate that a user has attempted to log in as "John Smith" and provides a user biosignature that is for "John Smith". Upon receiving the verification request comprising the user biosignature and user identifying information (e.g., name of the related user), the smart engine 210 may perform a user search in memory 204 to extract a biosignature profile for John Smith. In scenarios where there are multiple users with the same name, the smart engine 210 may rely on other user identifying information (e.g., age, gender, etc.) to access the biosignature profile of the correct user. However, if the smart engine 210 is unable to identify the correct user via user identifying information, the smart engine 210 may generate a list of potential biosignature profiles that may be associated with the generated user biosignature. Following this step, the smart engine 210 may further evaluate user attributes comprising the generated user biosignature against historical user attributes belonging to users from the list of potential biosignature profiles to identify the correct user.

As shown in operation 704, the apparatus 200 includes means, such as smart engine 210, for verifying the received user biosignature. Upon identifying the correct biosignature profile, the smart engine 210 may perform biosignature template matching by determining whether the generated user biosignature satisfies a similarity threshold. A similarity threshold refers to a measure of similarity between the generated user biosignature and a historical user biosignature of the particular user, and may be predefined as a point beyond which the similarity between the generated user biosignature and a historical user biosignature may be deemed significant. The smart engine 210 may generate a score for the measure of similarity by comparing (i) user attributes from the generated user biosignature against historical user attributes from the historical user biosignature, (ii) inter-data type relationships against historical inter-data type relationships, (iii) intra-data type relationships against historical intra-data type relationships, and/or the like. In some embodiments, the smart engine 210 may compare the generated user biosignature against an average of all historical user biosignatures of the particular user, or may compare the generated user biosignature against the most recently generated historical user biosignature. A most recently generated historical user biosignature may refer to a user biosignature generated for a previous biosignature usage event that is not the current biosignature usage event, or may refer to a user biosignature generated for the current biosignature usage event but at a time prior to the current time.

As shown in operation 706, the apparatus 200 includes means, such as communications hardware 206, or the like, for transmitting a positive verification result in the event that the similarity threshold is satisfied. By way of continued example, if the verification server generates a positive verification result, communications hardware 206 may subsequently transmit the positive verification result to the bank device, indicating that the generated user biosignature has met the predefined similarity threshold. Upon receiving the positive verification result, the bank device may authenticate the user attempting to log into the online bank account. In alternative embodiments, the communications hardware 206 may transmit the positive verification result directly to the user device 110A-110N. This may occur in scenarios involving multi-factor authentication, wherein transmitting a positive verification result directly to the user device may be part of a multi-channel authentication approach.

As shown in operation 708, the apparatus 200 includes means, such as communications hardware 206, or the like, for transmitting a negative verification result in the event that the similarity threshold is not satisfied. In this case, the verification server may generate a negative verification result and use communications hardware 206 to transmit the negative verification result to the bank device, indicating that the generated user biosignature has not met the predefined similarity threshold. In such cases, the bank device may perform subsequent steps that align with operational procedures pre-established by the bank. For instance, the bank device may temporarily lock the account and/or deactivate the service associated with the user's login attempt, may refer the user to a customer service representative for further assistance, or may trigger the user biosignature generation system 102 to reinitialize and regenerate a user biosignature that may be re-verified against a historical user biosignature, and/or the like. The bank device may prioritize any one, or a combination of the aforementioned operational procedures in a particular order (e.g., re-initialize and perform procedure 300 at a first failed authentication attempt, temporarily lock the account associated with the user biosignature usage event at a second failed authentication attempt, and refer the user to a customer service representative at a third failed authentication attempt, and/or the like). In some embodiments, the communications hardware 206 may transmit the negative verification result directly to the user device 110A-110N. This may occur in scenarios involving multi-factor authentication, wherein transmitting a negative verification result directly to the user device may be part of a multi-channel authentication approach. In some embodiments, transmission of a negative verification result may serve as a security alert that notifies a secondary user device and/or entity device of potential unauthorized access or suspicious activity.

FIGS. 3-7 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

Conclusion

As described above, example embodiments provide methods and apparatuses designed to systematically generate a user biosignature for a user. Such solutions have not previously been used, and are only achievable by harnessing the computational capabilities and widespread data accessibility offered by modern internet connectivity. Example embodiments tackle the inherent limitations associated with the exclusive reliance on raw biometric data for user authentication and ensure a highly personalized user authentication experience for users. The iterative training process of the multimodal machine learning model adds a layer of adaptability that allows the user biosignature generation system to continually refine the user biosignature based on evolving biometric and metadata identifiers. As establishments increasingly seek reliable, efficient, and adaptable solutions to address the challenges of traditional methods of authentication, example embodiments offer a comprehensive approach to enhance security, operational efficiency, and streamline user authentication. Further, example embodiments rely on computational methods that obviate the use of manual methods of authentication, thereby eliminating the potential for human error and/or malicious human activity. Finally, by automating user biosignature generation in response to the detection of a biosignature usage event, example embodiments mitigate scenarios in which users might not derive the robust protection and account security provided by the user biosignature generation system.

As these examples all illustrate, example embodiments contemplated herein provide technical solutions that solve real-world problems faced by establishments using traditional methods of authentication. And while using traditional methods of authentication is a common practice, the recently exploding amount of fraudulent attacks made possible by recently emerging AI technology today has made the challenges associated with using traditional methods of authentication significantly more acute. Thus, example embodiments described herein unlock new avenues for ensuring data security that historically were not available, such as by blending metadata with biometric data to generate a unique user biosignature, and represent a technical solution to these real-world problems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for generation of a user biosignature, the method comprising:
    extracting, by a mining engine, user data from a data environment, wherein the user data is associated with a user;
    analyzing, by a smart engine and using a multimodal machine learning model, the user data, wherein the user data comprises one or more data types, wherein the one or more data types comprises at least metadata and biometric data;
    determining, by the smart engine and using the multimodal machine learning model, a character classification associated with each of the one or more data types based on the analyzed user data, wherein the character classification comprises a primary character classification and a secondary character classification;
    generating, by the smart engine and using the multimodal machine learning model, the user biosignature based on the determined character classification; and
    outputting, by communications hardware, the generated user biosignature.

2. The method of claim 1, wherein extracting the user data from the data environment further comprises identifying, by the mining engine, a user type associated with the user.

3. The method of claim 1, wherein analyzing the user data further comprises:
    classifying, by the smart engine and using the multimodal machine learning model, the user data into the one or more data types, wherein the one or more data types comprise one or more user attributes; and
    determining, by the smart engine and using the multimodal machine learning model, one or more intra-data type relationships and one or more inter-data type relationships for each of the one or more data types.

4. The method of claim 3, further comprising:
    identifying, by the smart engine, at least one qualitative difference and at least one quantitative difference for each of (i) the one or more intra-data type relationships compared to one or more historical intra-data type relationships, and each of (ii) the one or more inter-data type relationships compared to one or more historical inter-data type relationships; and
    training, by the smart engine and based on the at least one qualitative difference and the at least one quantitative difference identified for each of (i) the one or more intra-data type relationships compared to one or more historical intra-data type relationships, and each (ii) the one or more inter-data type relationships compared to one or more historical inter-data type relationships, a multimodal machine learning model.

5. The method of claim 3, further comprising determining the character classification by:
    determining, by the smart engine and using the multimodal machine learning model, (i) the primary character classification associated with each of the one or more data types and (ii) the secondary character classification associated with each of the one or more intra-data type relationships and one or more inter-data type relationships, wherein the secondary character classification comprises a character repetition pattern.

6. The method of claim 1, wherein generating the user biosignature further comprises:
    determining, by the smart engine and using the multimodal machine learning model, a character sequence based on the primary character classification and the secondary character classification.

7. The method of claim 1, wherein outputting the generated user biosignature further comprises:
    updating, by the communications hardware and based on the generated user biosignature, a user biosignature profile associated with the user, wherein the user biosignature profile comprises the user biosignature and one or more historical user biosignatures.

8. An apparatus for generation of a user biosignature, the apparatus comprising:
    a mining engine configured to:
        extract user data from a data environment, wherein the user data is associated with a user;
    a smart engine configured to:
        analyze, using a multimodal machine learning model, the user data, wherein the user data comprises one or more data types, wherein the one or more data types comprise at least metadata and biometric data,
        determine, using the multimodal machine learning model, a character classification associated with each of the one or more data types based on the analyzed user data, wherein the character classification comprises a primary character classification and a secondary character classification, and
        generate, using the multimodal machine learning model, the user biosignature based on the determined character classification; and
    communications hardware configured to:
        output the generated user biosignature.

9. The apparatus of claim 8, wherein the mining engine is further configured to identify a user type associated with the user.

10. The apparatus of claim 8, wherein the smart engine is further configured to:

classify, using the multimodal machine learning model, the user data into the one or more data types, wherein the one or more data types comprise one or more user attributes; and determine, using the multimodal machine learning model, one or more intra-data type relationships and one or more inter-data type relationships for each of the one or more data types.

11. The apparatus of claim 10, wherein the smart engine is further configured to:

identify at least one qualitative difference and at least one quantitative difference for each of (i) the one or more intra-data type relationships compared to one or more historical intra-data type relationships, and each of (ii) the one or more inter-data type relationships compared to one or more historical inter-data type relationships; and train, based on the at least one qualitative difference and the at least one quantitative difference identified for each of (i) the one or more intra-data type relationships compared to one or more historical intra-data type relationships, and each of (ii) the one or more inter-data type relationships compared to one or more historical inter-data type relationships, a multimodal machine learning model.

12. The apparatus of claim 8, wherein the smart engine is further configured to:

determine, using the multimodal machine learning model, (i) the primary character classification associated with each of the one or more data types and (ii) the secondary character classification associated with each of the one or more intra-data type relationships and one or more inter-data type relationships, wherein the secondary character classification comprises a character repetition pattern.

13. The apparatus of claim 8, wherein the smart engine is further configured to:

determine, using the multimodal machine learning model, a character sequence based on the primary character classification and the secondary character classification.

14. The apparatus of claim 8, wherein the communications hardware is further configured to:

update, based on the generated user biosignature, a user biosignature profile associated with the user, wherein the user biosignature profile comprises the user biosignature and one or more historical user biosignatures.

15. A computer program product for generation of a user biosignature, the computer program comprising at least one non-transitory computer readable storage medium storing software instructions that, when executed, cause an apparatus to:

extract user data from a data environment, wherein the user data is associated with a user;

analyze, using a multimodal machine learning model, the user data, wherein the user data comprises one or more data types, wherein the one or more data types comprise at least metadata and biometric data;

determine, using the multimodal machine learning model, a character classification associated with each of the one or more data types based on the analyzed user data, wherein the character classification comprises a primary character classification and a secondary character classification;

generate, using the multimodal machine learning model, the user biosignature based on the determined character classification; and output the generated character sequence, wherein the generated user biosignature is an indicative representation of the user biosignature.

16. The computer program product of claim 15, wherein the software instructions, when executed, further cause the apparatus to identify a user type associated with the user.

17. The computer program product of claim 15, wherein the software instructions, when executed, further cause the apparatus to:

classify, using the multimodal machine learning model, the user data into the one or more data types, wherein the one or more data types comprise one or more user attributes; and determine, using the multimodal machine learning model, one or more intra-data type relationships and one or more inter-data type relationships for each of the one or more data types.

18. The computer program product of claim 17, wherein the software instructions, when executed, further cause the apparatus to:

identify, at least one qualitative difference and at least one quantitative difference for each of (i) the one or more intra-data type relationships compared to one or more historical intra-data type relationships, and each (ii) the one or more inter-data type relationships compared to one or more historical inter-data type relationships; and train, based on the at least one qualitative difference and the at least one quantitative difference identified for each of (i) the one or more intra-data type relationships compared to one or more historical intra-data type relationships, and each (ii) the one or more inter-data type relationships compared to one or more historical inter-data type relationships, a multimodal machine learning model.

19. The computer program product of claim 15, wherein the software instructions, when executed, further cause the apparatus to:

determine, using the multimodal machine learning model, (i) the primary character classification associated with each of the one or more data types and (ii) the secondary character classification associated with each of the one or more intra-data type relationships and one or more inter-data type relationships, wherein the secondary character classification comprises a character repetition pattern.

20. The computer program product of claim 15, wherein the software instructions, when executed, further cause the apparatus to:

determine, using the multimodal machine learning model, a character sequence based on the primary character classification and the secondary character classification.

\* \* \* \* \*